United States Patent [19]
Irvine

[11] 3,773,126
[45] Nov. 20, 1973

[54] SNOWMOBILE SUSPENSION SYSTEM

[75] Inventor: Gerald O. Irvine, Ironton, Minn.

[73] Assignee: Scorpion, Inc., Crosby, Minn.

[22] Filed: Sept. 2, 1971

[21] Appl. No.: 177,378

[52] U.S. Cl. .................................. 180/5 R, 305/24
[51] Int. Cl. ............................................. B62m 27/02
[58] Field of Search....................... 180/5, 9.54, 9.58

[56] References Cited
UNITED STATES PATENTS

| | | | |
|---|---|---|---|
| 3,213,955 | 10/1965 | Hetteen | 180/5 R |
| 3,485,312 | 12/1969 | Swenson | 180/5 R |
| 3,404,745 | 10/1968 | Smieja | 180/5 R |
| 3,664,446 | 5/1972 | Burtis | 180/5 R |
| 3,613,810 | 10/1972 | Hetteen | 180/5 R |
| 3,703,936 | 11/1972 | Padwick | 305/27 |
| 3,705,637 | 12/1972 | Harvey | 180/5 R |
| 3,705,749 | 12/1972 | Harvey | 180/5 R |

Primary Examiner—Richard J. Johnson
Attorney—Frederick E. Lange et al.

[57] ABSTRACT

An improved suspension system for an endless track vehicle having a body, an endless track, and a front and rear axle, wherein said improved suspension system includes a pair of elongated members disposed beneath said vehicle and within said endless track, and a plurality of track engaging means supported by said elongated members, each of said elongated members having one end connected with the rear axle of the vehicle and the other end extending forwardly toward the front axle of said vehicle with the forward portion of each of the members being resiliently mounted with respect to the vehicle frame by a support means.

19 Claims, 12 Drawing Figures

PATENTED NOV 20 1973　　　　　　　　　3,773,126

INVENTOR.
Gerald O. Irvine
BY David N. Fronek
ATTORNEY

FIG. 4.

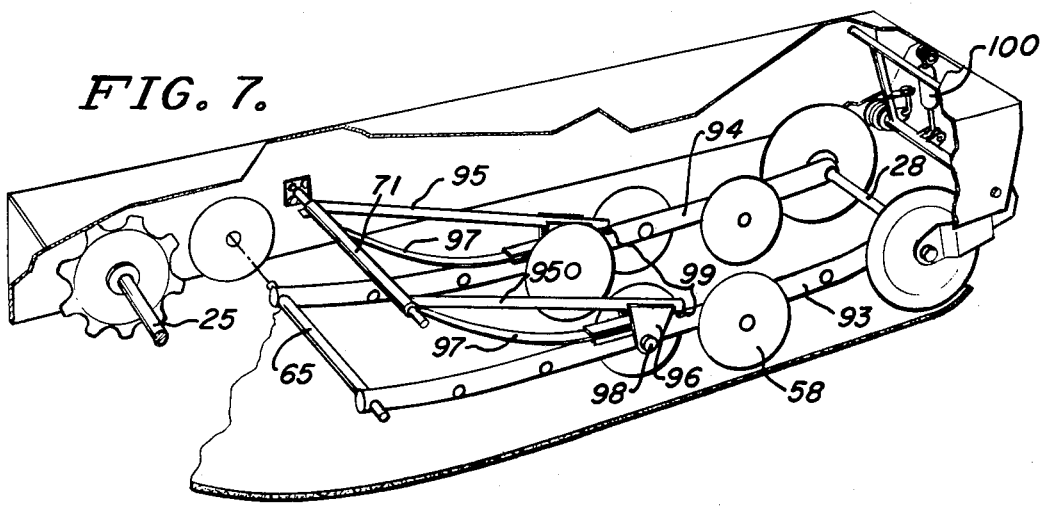
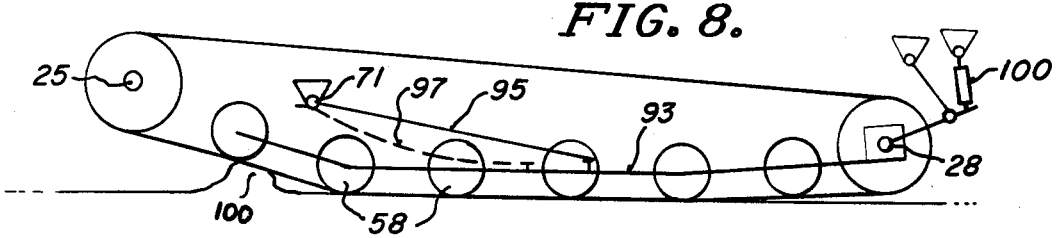
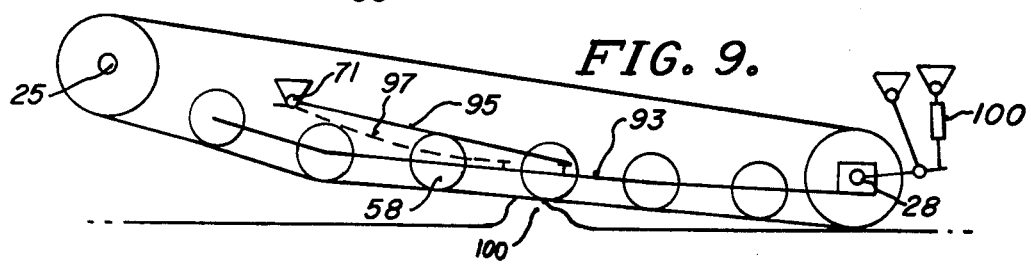
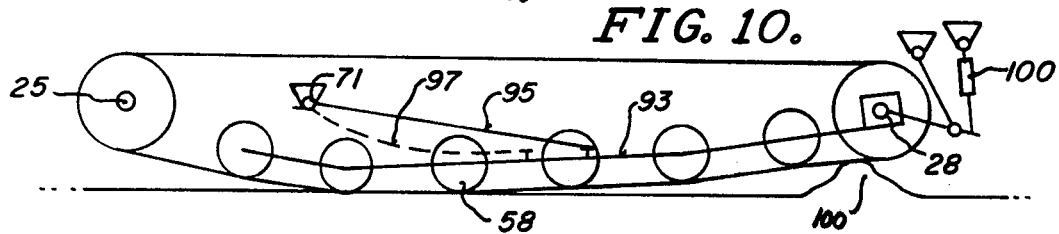
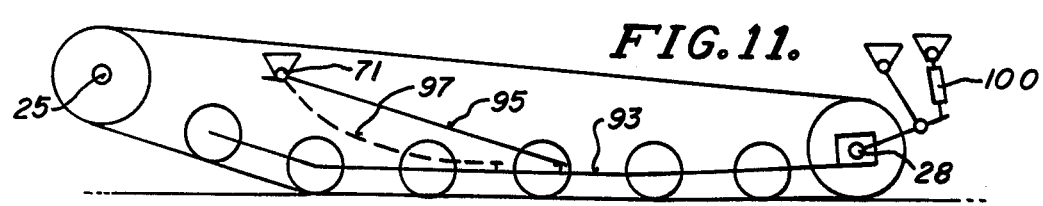
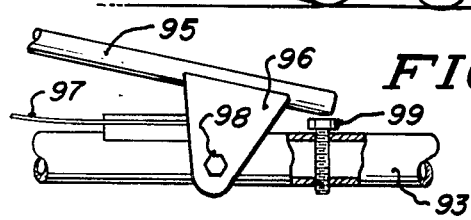

SNOWMOBILE SUSPENSION SYSTEM

BACKGROUND OF THE INVENTION

The present invention relates generally to a suspension system for an endless track vehicle and more specifically to a unitized frame suspension system for a snowmobile. The snowmobile or snow vehicle with which the present invention is designed to be used generally includes a main body portion having its forward end supported by a pair of skis or skids for steering the vehicle and having at its rearward end a track means for propelling the vehicle. The vehicle is generally supported by a resilient suspension system disposed within the track means which, because snowmobiles are of relatively light construction, must necessarily be as simple and compact as possible while still providing the necessary resilient action.

A conventional snowmobile suspension system includes a track engaging means designed to contact and engage the inner surface of the endless track and a support means adapted to resiliently suspend the track engaging means from the snowmobile body. Although conventional track engaging means normally comprise a plurality of rotatably mounted bogie wheels or a pair of enlongated slide rails, there are a vast number of different support means to resiliently support these track engaging means.

One such support means commonly used with bogie wheels includes a plurality of shafts or axles longitudinally spaced along the snowmobile body. With this support means, each bogie wheel is resiliently and rotatably mounted to one of the shafts by a spring biased arm which biases the bogie wheel downwardly with respect to the shaft. Although this particular suspension system is quite adequate for lower speeds, the bogie wheels tend to support the vehicle individually as speeds increase or when bumps are encountered, thereby resulting in a harsh ride.

SUMMARY OF THE INVENTION

In contrast to the vehicle suspension systems of the past, the present invention provides an endless track suspension system designed to be used in a conventional snowmobile or other endless track vehicle and designed to be used in combination with either bogie wheels or slide rails. More specifically, the suspension system of the present invention includes a unitized undercarriage which in one embodiment comprises a pair of relatively flexible members and which in another embodiment comprises a pair of relatively rigid tubular members. In both embodiments the pair of members are disposed longitudinally beneath the snowmobile body and within the width of the snowmobile track. As will be described below, this unitized suspension frame is adapted to support either conventional bogie wheels or conventional slide rails as the track engaging means. One of the primary reasons for utilizing a unitized frame suspension system is to give each portion of the suspension system some individual resiliency or support, while at the same time, permitting the necessary interaction among these various portions so that the entire system functions as a unit.

In each embodiment, one end of each of the members is connected with the rear axle of the snowmobile while the other end extends forwardly from the rear axle toward the front axle. In turn, support means are provided for resiliently suspending each of the members with respect to the snowmobile body at a point intermediate between their ends. Each support means includes a leaf spring having one end connected with its respective member and having the other end connected with a portion of the snowmobile body, and a rigid tubular member pivotable at one end to its respective member and pivotable at the other end to a portion of the snowmobile body.

The present invention also provides an improved means for controlling the elevation of the skiis during acceleration so that the vehicle can be adapted for various uses. This is accomplished by limiting the pivotal movement of the support means and more specifically, by limiting the pivotal movement of the tubular member. By properly positioning an adjustable stop adjacent to one end of the tubular member, the pivotal movement of this member can be limited. As will be described below, this has the effect of controlling the elevation of the forward end of the vehicle.

One of the principal advantages of the suspension system of the present invention is to provide a much smoother ride. This is accomplished primarily by the novel unitized undercarriage and by the novel support means connecting and resiliently suspending this undercarriage with respect to the snowmobile body. As the forward end of the vehicle encounters a bump, the suspension system is quite easily depressed. As the snowmobile moves over the bump and the bump progresses rearwardly along the track, the ease with which the belt and suspension system are depressed is gradually increased. Because of this a ramp-like effect is created, thereby resulting in a much smoother ride.

Accordingly, it is an object of the present invention to provide an improved suspension system for an endless track vehicle comprising a unitized undercarriage.

Another object of the present invention is to provide an improved suspension system for an endless track vehicle which may be adapted for use with either bogie wheels or slide rails as the track engaging means.

A further object of the present invention is to provide an improved suspension system for an endless track vehicle having an improved means for controlling the elevation of the forward end of the vehicle.

Another object of the present invention is to provide an improved suspension system for an endless track vehicle which provides a much smoother ride for the operator of the vehicle.

These and other objects and advantages of the present invention will become apparent by reference to the following description of the preferred embodiment, the drawings, and the appended claims.

DESCRIPTION OF THE DRAWINGS

FIG. 4 is a perspective view of the suspension system of the present invention with the body of the snowmobile removed.

FIG. 7 is a perspective view showing a second embodiment of the present invention.

FIGS. 8–11 are schematic views showing the snowmobile in various positions while proceeding over a bump. FIG. 12 is a view of the means for controlling the ski elevation which is adapted to be used with the second embodiment.

DESCRIPTION OF THE PREFERRED EMBODIMENT

Figure 1:
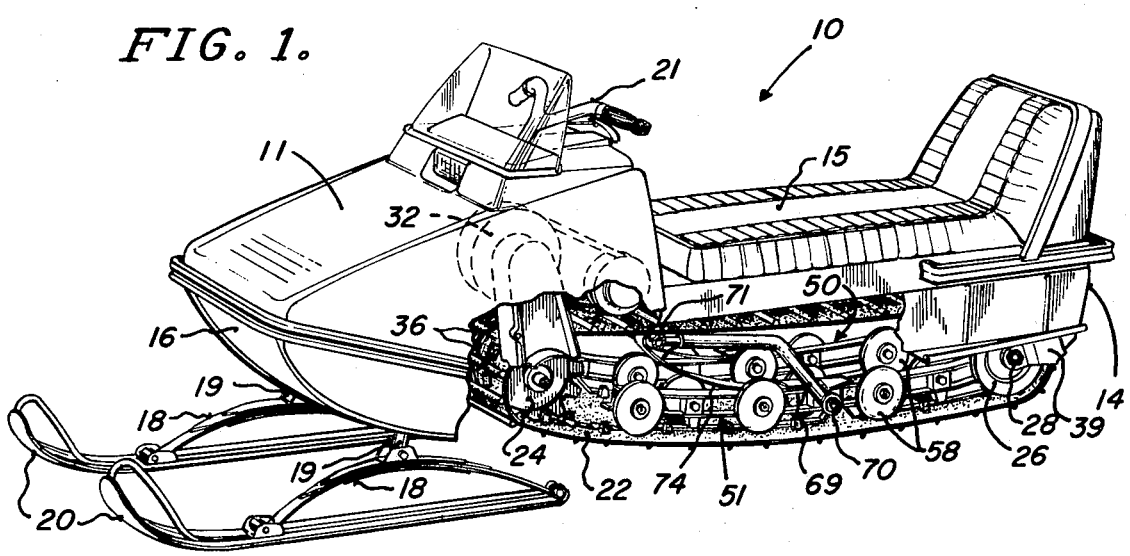
FIG. 1 is a perspective view of a snowmobile with a portion broken away to show the suspension system of the present invention.

Referring first to FIG. 1, the endless track snow vehicle 10 of the present invention includes a hood 11 defining the front end or front portion 16 of the vehicle 10, a tunnel portion 12 connected with the front end of the snowmobile and extending rearwardly along the vehicle 10, a rear portion 14 defining the rearward end of the tunnel portion 12, and a seat member or cushion 15 disposed above the tunnel portion 12 for seating one or two passengers during operation of the snowmobile. The front portion 16 of the vehicle 10 is resiliently suspended above the ground by a pair of spring members 18 and the pins 19. Attached to the bottom ends of the spring members 18 are a pair of skis or skids 20 adapted to support the vehicle 10 on the surface of the snow and to guide the vehicle therealong. The skis 20, via the pin 19 are connected to a steering mechanism which includes the handlebars 21 for steering the vehicle.

Figure 4:
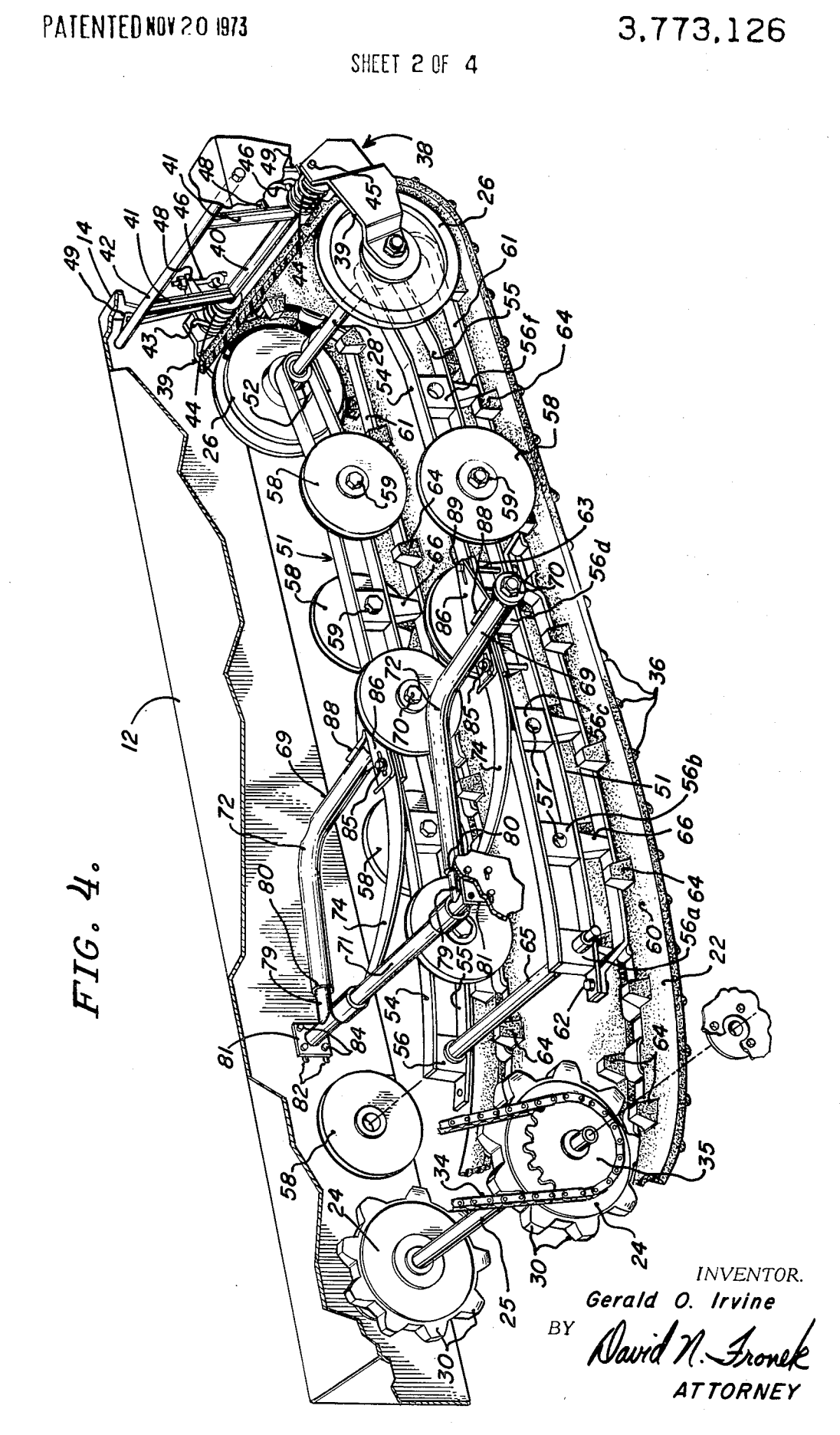

The snowmobile 10 is propelled along the surface of the snow by an endless flexible belt or track 22 extending from the front portion of the snowmobile to a position substantially below the rear portion of the snowmobile. As best shown in FIG. 4, the endless track 22 is supported by a pair of front drive sprockets 24 mounted on a front axle 25 and by a pair of rear idler sprockets 26 mounted on a rear axle 28. To properly engage the track 22, each of the drive sprockets 24 includes a plurality of teeth 30 positioned about its periphery for engagement with a plurality of recessed areas 29 disposed on the inside surface of the track 22. The recessed areas are spaced so that they cooperate with and engage the teeth members 30 of the drive sprockets 24.

The track 22 which is commonly constructed from a rubber or polyurethane material is centrally located beneath the vehicle body between the two sides of the tunnel portion 12. The width of the track 22 is such that it can fit between and under the tunnel portion 12 of the vehicle 10 and extend around the drive sprockets 24 enclosed by the tunnel portion 12. Consequently, as shown in FIG. 1, the track 22, when properly connected with the vehicle is partially enclosed by the tunnel portion 12.

The track 22 is driven by an internal combustion engine which is partially shown in FIG. 1 by the broken line 32. The drive shaft of the engine 32 is connected by a suitable roller chain 34 (FIG. 4) to a toothed sprocket 35 positioned immediately to the outside of one of the drive sprockets 24 and securely mounted on the front axle 25 so that the drive sprockets 24 are driven by the engine 32. The rotation of the sprockets 24, in turn, causes the track 22 to move around the toothed sprockets 24 and thereby propel the vehicle 10 (FIG. 1) along the snow. As shown in FIGS. 1, 2, 4 and 5, the outside surface of the belt 22 includes a plurality of ribs 36 which give traction to the track 22 as it propels the vehicle 10 forward.

Figure 5:
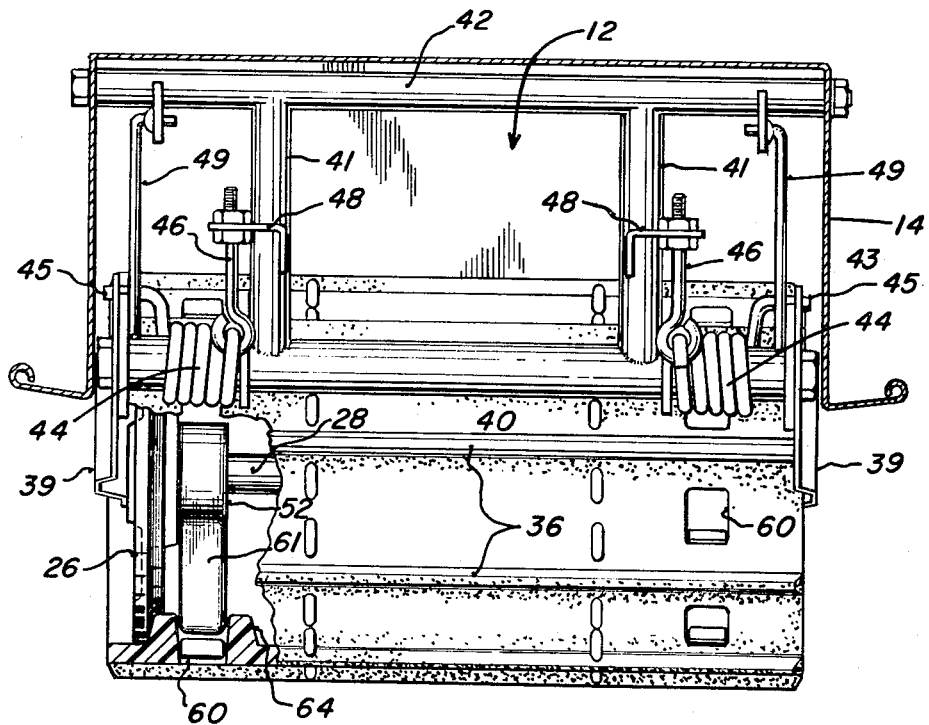
FIG. 5 is an elevated view of the rear portion of the snowmobile showing the means for resiliently suspending the rear axle with respect to the snowmobile body, with a portion of the track broken away.

The rear axle 28 is resiliently mounted with respect to the snowmobile body by a rear suspension system indicated generally by the reference numeral 38. As shown in FIGS. 4 and 5, the rear axle 28 is rotatably mounted in one end of an arm member 39, the other end of which is pivotally secured to an intermediate axle 40. The axle 40, in turn, is connected with the shaft 42 by the braces 41. The shaft 42 is rotatably secured to the rear portion 14 of the vehicle body by an appropriate mounting means. The suspension system 38 further includes a pair of tension springs 44 positioned on each end of the axle 40 which are adapted to urge the rear axle 28 toward a counter clockwise movement about the axle 40 as viewed in FIG. 2. Each of the coil springs 44 includes a tail portion which passes through a hole 45 in the arm member 39 for anchoring the coil spring 44 with respect to the arm member. The other end of each of the coil springs 44 includes a loop portion associated with an adjustable eye bolt 46 which is adapted to be connected by an appropriate connection 48 to the brace members 41.

With this construction, the coil springs 44 bias each of the arm members 39 outwardly and downwardly about the axle 40 to thereby prevent or limit the inward and upward movement of the arm member 39, the axle 28, and the sprockets 26, about the axle 40 due to the weight of the vehicle and the riders upon the axle 28. The tension in the coil springs 44, and therefore the force urging the axle 28 downwardly about the axle 40, can be directly varied by an appropriate adjustment of the eye bolts 46. For example, when the threaded member of the eye bolt 46 is rotated so that the effective length of the eye bolt 46 is shortened, the tension in the coil springs 44 is increased, and the force biasing the axle 28 outwardly and downwardly about the axle 40 is increased. This adjustment results in a less flexible rear suspension system.

While the front and rear ends of the track 22 are supported via the front axle 25 and sprockets 24 and the rear axle 28 and sprockets 26 respectively, the center portion of the track 22 is resiliently suspended with respect to the snowmobile body via an improved suspension system 50. With reference to FIG. 4, one embodiment of this improved suspension system includes a pair of flexible members 51 each comprising a pair of vertically spaced elongated spring members 54 and 55 disposed on each side of the snowmobile. Each of the members 51 has one end connected with the rear axle 28 via the cylindrical member 52 and the other end extending forwardly from the rear axle 28 toward the front axle 25. Although FIG. 4 shows each of the members 51 as including a single elongated spring member wrapped around the axle 28 so that it forms two parallel elongated spring members, an obvious alternative would be to provide two vertically spaced leaf spring members connected independently to the rear axle 28 and extending forwardly toward the front axle 25.

Figure 2:
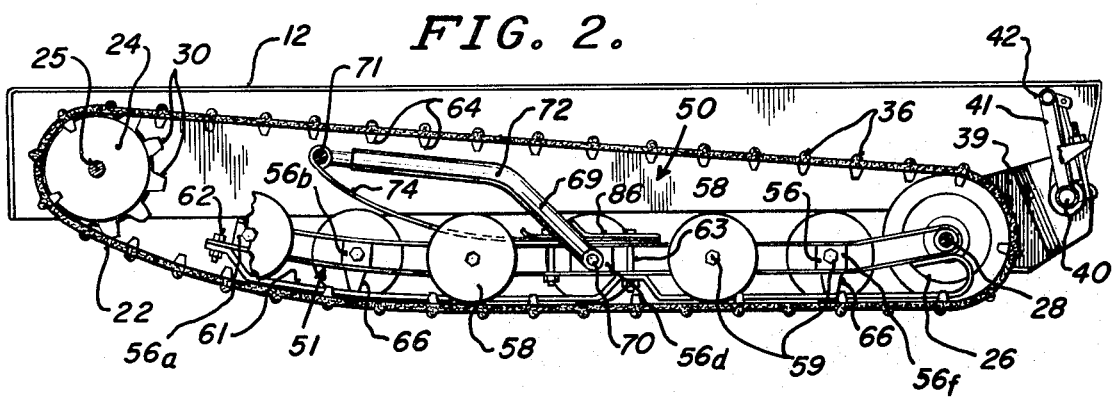
FIG. 2 is a side elevated view partially in section of the suspension system of the present invention as it is disposed within the endless track. The view of FIG. 2 is a view immediately inside of the rear idler sprocket.

As illustrated best in FIGS. 2 and 4, the leaf springs 54 and 55 are maintained in a vertically spaced relationship by a plurality of resilient members 56 (a–f) disposed between the springs 54 and 55 and longitudinally spaced therealong. Although not specifically illustrated, the present invention also contemplates replacing the plurality of resilient members 56 (a–f) by a continuous strip of flexible material extending along the entire length of the spring members 54 and 55. In addition to maintaining the spring members 54 and 55 in a proper vertically spaced relationship, the members 56 (a–f) also serve to dampen vibratory movements caused as a result of the snowmobile passing over bumps and rough terrain. When a bump or obstacle is encountered by a snowmobile, the resilient members 56 (a–f) tend to shear rather than transmit the impact of the bump or the vibratory movement directly to either of the spring members 54 and 55. Consequently, the vibratory movements imparted to the vehicle body or frame are significantly reduced. The resilient members 56 (a–f) are also adapted to rotatably support a plurality of bogie wheels 58 spaced longitudinally along the members 54 and 55. Each of the wheels 58 is rotatably mounted between the members 54 and 55 to the resilient members 56 by an appropriate bearing and axle means 59. When thus mounted, the bogie wheels 58 engage the inside surface 60 of the track 22 to thereby maintain the spring members 54 and 55 properly vertically spaced with respect to the track 22.

It should be appreciated that at various times and under certain snow conditions a type of track engaging means other than the bogie wheels may be more advantageously used and, under some conditions, other track engaging means may be used in addition to the bogie wheels. For example, as shown in FIGS. 2 and 4, the bottom leafspring 55 of each pair of members 51 is adapted to connect with a slide rail 61 which is bolted to the leafspring member 55 by the bolts 62 at various points therealong. The slide rail 61 is additionally connected with the member 55 by the members 66 which are longitudinally spaced along the sliderail 61 between the sliderail 61 and the spring member 55 and which are primarily adapted to maintain the sliderail 61 and the spring member 55 in a proper vertically spaced arrangement. The sliderails, when utilized, engage the inside surface 60 of the track 22 along a longitudinal channel which is defined by a plurality of laterally spaced upright members 64.

Figure 6:
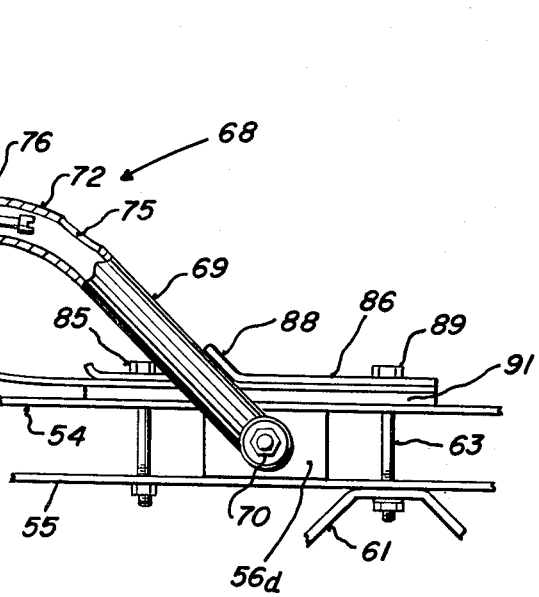
FIG. 6 is an elevated side view, partially in section, of the means for resiliently connecting the unitized undercarriage of the present invention with the snowmobile body.

With specific reference now to FIG. 6 and general reference to FIGS. 2 and 4, the forward portions of each of the pair of leafspring members 54 and 55 are resiliently supported with respect to the snowmobile body by a support means, indicated generally by the reference numeral 68. More specifically, the support means 68 includes a tubular member or arm 69 pivotable at one end to the shaft 70 which extends through and is supported by the resilient member 56 (d) and pivotable at its other end about the shaft 71 which extends transversely across the vehicle frame or body, and a spring member 74 extending between the shaft 71 and the upper leaf spring member 54. As illustrated in FIG. 6, the tubular member 69 includes a knee portion 72 intermediate between its ends which allows the spring members 54 and 55 to be depressed and flexed without danger of the bogie wheels 58 contacting the tubular member 69. The generally tubular member 69 also includes a tubular end portion 80 which is telescopically associated with the member 79. The member 79 has one end pivotally connected to the shaft 71 and the other end slidably extending inside the tubular portion 80 and engaging the end of a threaded member 76.

The threaded member 76 is threadedly received by the member 78 rigidly secured within the tubular member 69. When the threaded member 76 is rotated so that it advances toward the left as viewed in FIG. 6, the member 79 similarly moves to the left to thereby extend the effective length of the tubular member 69. Likewise, when the member 76 is rotated so that it moves to the right as viewed in FIG. 6, the member 79 is retracted to thereby reduce the effective length of the member 69. This ability to vary the length of the member 69 enables the resiliency and cushioning effect of the support means 68 to be adjusted. To accomplish the adjustment, a hole 75 is positioned in the knee portion 72 of the tubular member 69 to enable the threaded member 76 to be rotated.

Additional adjustment means are provided by the manner in which the plates 81 are connected with the vehicle body. As shown, each of the plates 81 includes a plurality of holes 82 adapted to align with a plurality of elongated openings in the vehicle frame. The plates 81, and thus the shaft 71 are then secured to the frame by a conventional bolt or screw 84 passing through the holes 82 and through their respective openings in the vehicle body. Because the openings in the vehicle body are elongated, the relative position of the plates 81 may be adjusted to achieve a result similar to the adjustment of the threaded member 76. By adjusting the position of the plate 81 forwardly or rearwardly, the resiliency or cushionability of the support means 68 can be varied.

Figure 3:
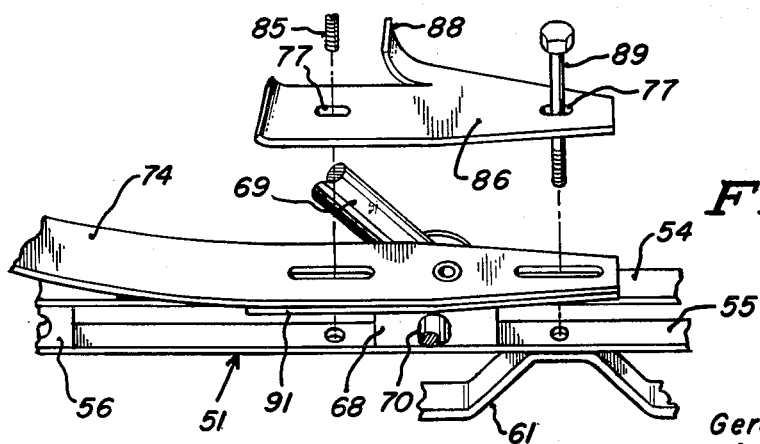
FIG. 3 is a perspective, partially exploded, view of the stop means assembly of the present invention.

Referring again to FIG. 6 and additionally to FIG. 3, the spring member 74 extends from the underside of the shaft 71 and is connected to the top side of the spring member 54 via the bolts 85 and 89 with a spacer plate 91 disposed therebetween. As best shown in FIG. 3, the holes in the member 74 and the plate 91 through which the bolts 85 and 89 pass are elongated thereby permitting the relative position of the member 74 to be changed.

Also associated with the support means 68 is a means for controlling the elevation of the front end of the snowmobile and the rearward pivotal movement of the tubular member 69 about the shaft 70. This means comprises a stop member 86 having a first portion disposed above the end of the leafspring 74 and a second portion including an upwardly extending end 88 designed to engage the rearward surface of the tubular member 69. The portion disposed above the leafspring 74 includes a pair of elongated openings 77 aligned substantially with the elongated openings in the spring member 74, thereby permitting the position of the stop member 86 to be longitudinally adjusted with respect to the spring member 74 and with respect to the axle 70. The adjustment is made by loosening the bolts 85 and 89 and moving the stop member 86 forwardly or rearwardly.

As mentioned above, the upwardly extending end 88 is adapted to engage the rearward surface of the tubular member 69. By moving the stop member 86 rearwardly, the upwardly extending end 88 is also moved rearwardly thereby allowing the tubular member 69 greater rearward pivotal movement about the axle 70. When the stop member 86 and thus the upwardly extending end 88 is moved forwardly, the rearward pivotal movement of the tubular member 69 is limited. The general effect of the longitudinal adjustment of the stop member 86 is to control the permissible elevation of the front end of the snowmobile and thereby shift the suspension forwardly or rearwardly. For example, as the stop member 86 is moved forwardly, the upward movement of the shaft 71 and thus the elevation of the forward end of snowmobile is limited as a result of the arm 69 engaging the upwardly extending end 88. In contrast, as the stop member 86 is moved rearwardly greater upward movement of the shaft 71 and the front end of the snowmobile is permitted. Under normal operating conditions the stop member 86 is generally moved forward to prevent elevation of the skiis and loss of steering control, whereas when racing, the stop member 86 is moved rearwardly to allow for elevation of the skiis and greater acceleration.

Reference is now made to FIG. 7 showing a second embodiment of the unitized undercarriage of the present invention. In this embodiment, the undercarriage comprises a pair of rigid tubular members 93 and 94 extending forwardly from the rear axle 28 toward the front axle 25. The extreme forward ends of each of the members 93 and 94 are connected with each other by the shaft 65 which extends therebetween. As in the first embodiment shown in FIGS. 1–6, a plurality of bogie wheels 58 are rotatably mounted to the members 93 and 94 by an appropriate bearing assembly and are designed to contact and engage the inner surface of the track. Also similar to the first embodiment, the track engaging means may comprise a pair of sliderails (not shown in FIG. 7) in addition to or in lieu of the bogie wheels 58.

Connected intermediate between the ends of each of the members 93 and 94 is a support means for resiliently suspending the unitized undercarriage from the snowmobile body or frame. Each of the support means comprises a rigid tubular arm member 95 and an enlongated leaf spring member 97 extending between the shaft 71 and the respective member 93 or 94. The arm member 95 is pivotally connected at one end to a transverse shaft 71 and pivotally connected at its other end to its respective member 93 or 94 via the bracket 96. As best shown in FIG. 12, the rearward end of the tubular arm 95 extends past the pivot point 98 where it is adapted to engage an adjustable stop member 99 which is threadedly received by each of the members 93 and 94. The stop 99 functions to limit the upward and rearward pivotal movement of the arm 95 about the pivot point 98. This effectively limits the front elevation of the vehicle during operation. For example, upon sudden acceleration, the forward body portion has a tendency to rise. This causes the shaft 71 to rise and also causes the arm 95 to pivot rearwardly about the pivot 98. However, because of the stop member 99, this rearward pivotal movement is limited.

When the vehicle is at rest, there is normally a gap between the rearward end of the arm 95 and the stop member 99. As the size of the gap is increased, the permissible elevation of the forward portion of the snowmobile is also increased. Under racing oonditions this gap is adjusted to permit considerable elevation of the front end of the snowmobile and thus greater accleration. In contrast, under normal operating conditions, the gap is adjusted smaller to prevent ski elevation and loss of steering control. Associated with the rearward portion of the vehicle illustrated in FIG. 7 is a shock absorber 100 which is adapted to cushion the rear axle 28.

The operation of both embodiments of the suspension system may be understood best by reference of FIGS. 8–11 showing the snowmobile in various stages as it passes over a bump 101. First of all, when the bump is encountered by the front portion of the suspension as shown in FIG. 8, the members 93 and 94 deflect upwardly, slightly flexing the spring member 97. At this time there is no reaction of the rear suspension to the bump. Next, as the bump proceeds along the track the spring 97 is increasingly flexed until the bump is directly under the point at which the spring 97 is connected to the respective member 93 or 94 as shown in FIG. 9. Even at this time there is little reaction of the rear suspension to the bump.

Next, as the bump proceeds further along the track, the flexing of the spring 97 decreases and the deflection of the rear suspension increases until the bump is directly under the rear axle 28. At this point, the rear suspension is fully deflected and the shock absorber 100 is fully extended. Finally, when the snowmobile has passed completely over the bump, the shock absorber 100 cushions the rebound of the rear axle 28 and the suspension returns to normal.

It should be noted that in both of the embodiments, the cushionability of the suspension system is a function of the flexibility of the elongated members 51, 51 (FIGS. 1–6) and 93, 94 (FIGS. 7–12), and a function of the position at which the leaf spring 74 (FIGS. 1–6) and 97 (FIGS. 7–12) is connected to those members. For example, the suspension system in the first embodiment is much more resilient than that in the second embodiment since the members 51, 51 are much more flexible than the members, 93, 94. Similarly, if the point at which the leaf springs 74 or 97 are mounted to the elongated members is moved rearwardly, the flexibility of the suspension system would be increased due to an increase in the leverage between the forward end of the system and the connection point of the leaf springs 74 or 97. Although the springs 74 or 97, and therefore the support means, may be connected at a point along the longitudinal length of the elongate members 51, 51 or 93, 94, the inventor has found that best results occur when the leaf spring is connected in the vicinity of the center of these members.

Although the preferred embodiment of the present invention has been described in particular detail, it should be appreciated that many other arrangements and variations or modifications of the illustrated embodiment disclosed herein may become apparent in view of this disclosure and may be made without departing from the spirit of the present invention. Therefore, the embodiments disclosed are intended only to illustrate two embodiments by which the present invention may be used. Further, it is intended that the invention should be limited solely by the appended claims, rather than the description of the preferred embodiments.

What is claimed is:

1. A suspension system for an endless track vehicle having a body, an endless track and a rear axle and a front axle supported by the vehicle body, said suspension system comprising:
   a pair of elongated members each supported at one end by said rear axle for pivotal movement only and extending forwardly toward said front axle;
   a single support means associated with each of said elongated members for resiliently supporting said elongated member with respect to the body of said vehicle, each of said support means having a rigid arm pivotally connected at one end to said elongated member between its ends and pivotally connected at the other end to the body of said vehicle at a point forward of the point at which said rigid arm is connected to said elongated member and at a point above said elongated member, said support means further including a leaf spring connected at one end to the body of said vehicle near the point at which said rigid arm is connected and connected at the other end to said elongated member for urging said rigid arm upwardly and rearwardly with respect to said elongated member;

means connected with said elongated member near the point at which said rigid arm is pivotally connected thereto for engaging said rigid arm and limiting the upward and rearward pivotal movement thereof with respect to said elongated member;

track engaging means connected with said pair of elongated members for engaging the inside surface of said track.

2. The suspension system of claim 1 having means for resiliently suspending said rear axle with respect to the body of said vehicle.

3. The suspension system of claim 1 wherein said track engaging means includes a plurality of bogie wheels.

4. The suspension system of claim 1 wherein said track engaging means includes a slide rail.

5. The suspension system of claim 1 wherein said support means are connected to each of said elongated members at a point so that at least one fourth of the length of said elongated member extends on either side of said connection point.

6. The suspension system of claim 1 wherein said support means are connected to each of said elongated members at a point midway between the ends of said elongated member.

7. The suspension system of claim 1 wherein each of said elongated members includes a relatively rigid tubular member.

8. The suspension system of claim 7 wherein said means for limiting the rearward pivotal movement of said arms includes an adjustable stop member secured to said tubular member.

9. The suspension system of claim 7 wherein said rigid arm is pivotally connected to a third axle secured to said body and extending transverse thereto, the position of said third axle being adjustable so as to vary the cushioning effect of said suspension system.

10. The suspension system of claim 9 having means for resiliently suspending the rear axle of said vehicle including a shock absorber.

11. A suspension system for an endless track vehicle having a body, an endless track, a rear axle and a front axle, said suspension system comprising:

a pair of elongated members connected at one end to said rear axle and extending forwardly toward said front axle, said elongated members including a pair of vertically spaced spring members and resilient means disposed between each pair of spring members for maintaining said spring members in a vertically spaced relationship;

support means connected with each of said elongated members between their ends thereof for resiliently suspending said pair of members with respect to the body of said vehicle; and track engaging means connected with said pair of elongated members for engaging the inside surface of said track.

12. The suspension system of claim 11 wherein each of said pair of vertically spaced spring members is a pair of leaf springs.

13. The suspension system of claim 11 wherein each of said support means includes a relatively rigid arm, pivotally connected at one end to the body of said vehicle and pivotally connected at the other end to one of said pair of vertically spaced spring members, and a third elongated spring member extending between the body of said vehicle and one of said pair of spring members.

14. The suspension system of claim 13 wherein said rigid arm is pivotally connected to a third axle secured to said body and extending transverse thereto, the position of said third axle being adjustable so as to vary the cushioning effect of said suspension system.

15. The suspension system of claim 13 wherein one end of said rigid arm includes a telescopic member and a threaded member for adjusting the length of said rigid arm.

16. The suspension system of claim 11 wherein said resilient means includes a plurality of resilient members disposed between said pair of spring members at spaced intervals.

17. The suspension system of claim 16 wherein said track engaging means are supported by said resilient members.

18. The suspension system of claim 13 having means for limiting the rearward pivotal movement of each of said relatively rigid arms to thereby control the elevation of the front end of said vehicle.

19. The suspension system of claim 18 wherein said means for limiting the rearward pivotal movement of said arms includes an adjustable stop member secured to the upper of each of said pair of vertically spaced spring members.

* * * * *